United States Patent
He et al.

(10) Patent No.: US 6,430,631 B1
(45) Date of Patent: Aug. 6, 2002

(54) ELECTRONIC CIRCUIT FOR THE CONVERSION OF DATA

(75) Inventors: Ping He, Munich; Guenther Rosenbaum, Penzberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/302,731

(22) Filed: Apr. 30, 1999

(30) Foreign Application Priority Data

Apr. 30, 1998 (DE) ......................................... 198 19 569

(51) Int. Cl.⁷ .............................................. G06F 13/14
(52) U.S. Cl. .......................... 710/52; 710/22; 710/27; 712/13
(58) Field of Search ............................ 710/22, 27, 52; 712/13

(56) References Cited

U.S. PATENT DOCUMENTS

| 5,504,903 A | * | 4/1996 | Chen et al. ..................... 713/1 |
| 5,664,156 A | * | 9/1997 | Wang et al. ............. 395/500.44 |
| 5,884,055 A | * | 3/1999 | Tung et al. .................. 710/127 |
| 5,974,528 A | * | 10/1999 | Tsai et al. .................. 710/127 |
| 6,072,944 A | * | 6/2000 | Robinson ............... 395/500.05 |
| 6,119,175 A | * | 9/2000 | Hakkarainen et al. ........ 710/22 |
| 6,209,118 B1 | * | 3/2001 | LaBerge ........................ 716/1 |

* cited by examiner

Primary Examiner—Jeffrey Gaffin
Assistant Examiner—Abdelmoniem Elamin
(74) Attorney, Agent, or Firm—Morrison & Foerster LLP

(57) ABSTRACT

The circuit converts data and has at least one programmable mini-processor, a program and data memory as well as a bus controller. For increasing the data throughput, the electronic circuit is integrated on an application-specific integrated circuit.

17 Claims, 2 Drawing Sheets

ELECTRONIC CIRCUIT FOR THE CONVERSION OF DATA

BACKGROUND OF THE INVENTION

The invention is directed to an electronic circuit for the conversion of data.

In telecommunications technology, data must frequently be processed with different objectives. Transformations from one data format into another data format (protocol conversion), address conversions as well as generating and attaching auxiliary information such as check bits to existing data formats are to be cited as typical examples. As a rule, simple processing jobs can be typically classified with regards to transmission means and reception means.

Traditionally, such processing jobs are implemented by simply constructed hardware circuits that are realized as logic circuits on, for example an ASIC. These hardware circuits are distinguished by high data throughput but have a serious disadvantage in that they are respectively designed and fashioned only for specific processing jobs, so that flexible adaptation to modify job descriptions is almost impossible. Modified job descriptions in the conversion of protocols or data formats therefore regularly require a redesign of the hardware circuit.

Architectures with microprocessor circuits, wherein the microprocessor accesses external memories via a data bus, offer a known alternative to pure hardware circuits. Compared to the aforementioned, pure hardware circuits, these microprocessor circuits offer the advantage that they can be flexibly adapted to modify job descriptions by simple modifications of the program code and without modification of their hardware architecture. However, they have the disadvantage that they usually run more slowly compared to the pure hardware circuits and therefore often do not exhibit an adequate data throughput.

SUMMARY OF THE INVENTION

It is an object of the present invention to provide an electrical circuit for the conversion of data with an enhanced data throughput that is also flexible for modified job descriptions.

According to a preferred embodiment of the present invention, the object is achieved in that the electronic circuit, which comprises at least one programmable mini-processor, a program and data memory as well as a bus controller, are integrated on an application-specific integrated circuit (ASIC).

As a result of the integration on the ASIC, the access times for the mini-processors to the program and data memory as well as to the bus controller are shortened. In both instances, the accesses ensue without using an external bus, which results in a clear increase in the data throughput. By modifying the program in the program and data memory, the circuit can be very flexibly adapted to modified job descriptions; a possibility for re-employment of the hardware given modified job descriptions is thus assured. By additional adaptation of the bus controller to new, external interfaces, the ASIC can also be employed in other electronic environments (on other assemblies).

In addition to an increase in the data throughput, an integration of the circuit also offers the advantage that the dependability is enhanced compared to a non-integrated structure. Further, the integration is also advantageous because the circuit is relatively simply constructed. The simple structure requires little development outlay since it is simple to realize by multiple employment of a low number of standard components such as, for example, microprocessors, memories or bus controllers. The integration of the circuit is also simplified in that the standard components are usually available to manufacturers of integrated circuits as library elements. Finally, it should also be pointed out that design errors in integrated circuits can often be eliminated by simple software measures, which contributes to an enhanced design reliability and to a shortening of the market introduction for the circuit.

Over and above this, specific embodiments of the present invention exhibit the following advantages.

The arrangement of a plurality of mini-processors in a pipeline architecture on the ASIC effects an additional enhancement of the data throughput of the ASIC due to a decentralized processing of data.

It is also advantageous to connect the mini-processors in the pipeline to one another via buffer memories for mutual data exchange. A time dependency of the series-connected processors is diminished by the buffer memories insofar as the point-in-time of the output of data by a preceding processor need not correlate with the point-in-time of the acceptance of such data by a following processor. In this way, the buffer memories prevent waiting times of those mini-processors in the pipeline that are dependent on an output of the processor that precedes them.

A fashioning of the buffer memories as first in/first out (FIFO) memories is particularly advantageous because these memories need no complicated addressing.

It is likewise advantageous for enhancing the data throughput that the bus controller comprises a data buffer in which data can be intermediately stored for an access to external memories (memory cycle). The data buffer prevents a waiting time of the mini-processor given external memory cycles. In particular, it allows a parallel operation of bus controller and mini-processor. Whereas the bus controller independently sequences all required, external memory accesses using its data buffer, the mini-processor can simultaneously implement the processing jobs assigned to it.

Given the employment of at least two mini-processors and two bus controllers in the circuit, it is recommended to provide a circuit-internal bus between the two bus controllers via which the data can be directly transmitted, that is, without the detour via the buffer memories of the pipeline. The employment of two bus controllers in the circuit allows access to two different external buses. The connection of the two bus controllers via a circuit-internal bus offers the advantage that data can be very quickly transmitted from a first external bus onto a second external bus without having to run through the pipeline of the mini-processors in a time-consuming manner.

In conclusion, it is advantageous for each of the two mini-processors lying closest to the external data buses to be respectively connected to a bus controller in order to increase the data throughput of the circuit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
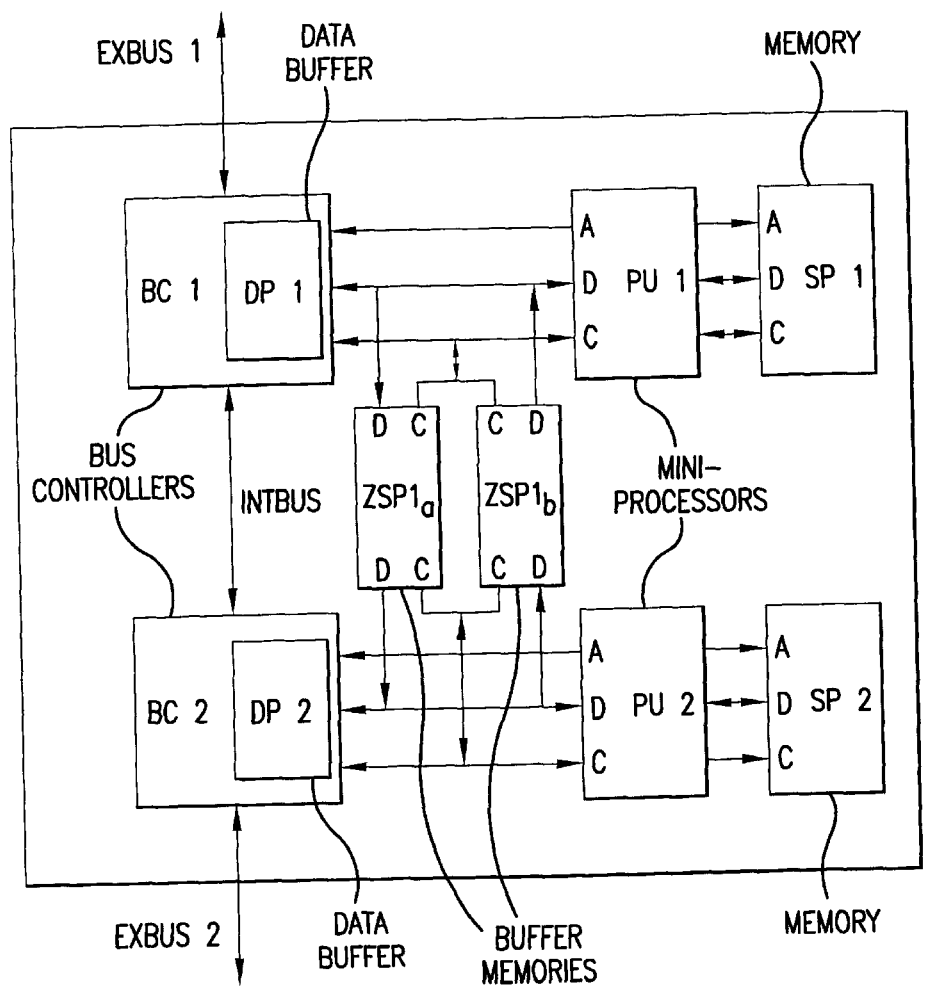
FIG. 1 is a block diagram of the inventive circuit with two integrated processors.

According to the first exemplary embodiment shown in FIG. 1, the electronic circuit comprises two mini-processors PU1, PU2 to which a memory SP1, SP2 is respectively directly allocated via address, data and control lines A, D, C. The memories are thereby fashioned as RAM (Random Access Memory) and serve both as program as well as data memory.

Both processors PU1, PU2 are arranged in a pipeline architecture for multiprocessor systems (processor pipeline), whereby they can communicate with one another via two intervening buffer memories ZSP1a, ZSP1b. Over and above this, the first processor PU1 is coupled to a first bus controller BC1, and the second processor PU2 is coupled to a second bus controller BC2. The first bus controller BC1 couples the circuit to a first external bus EXBUS1, whereas the second bus controller BC2 couples the circuit to a second external bus EXBUS2. Both bus controllers each respectively comprise a data buffer DP1, DP2 and are connected to one another via an internal bus INTBUS.

The processing of data ensues in the processor pipeline. The two buffer memories $ZSP1_a$, $ZSP2_b$ serve for the communication of the two processors PU1, PU2 with one another in the pipeline, whereby the buffer memory $ZSP1_a$ only allows a data transfer from the first to the second processor, whereas the buffer memory $ZSP1_b$ enables the data transfer in the opposite direction. Both buffer memories are fashioned as FIFO memories and can be respectively addressed by the processors as registers. Specific statuses of the buffer memories such as "empty" or "full" can be indicated by specific control signals and can be interrogated with software.

A communication of the circuit with external components, for example external memories (not shown here) that are connected to the external buses EXBUS1 or EXBUS2, ensues via the two bus controllers BC1 or BC2. The bus controllers BC1, BC2 control bidirectional communication requests (memory cycles) between the circuit and the external components, whereby they use their internal data buffers DP1, DP2 as intermediate memories for data to be transferred. Due to the existing data buffers, the data transfer of the bus controllers BC1 and BC2 ensues independently of the processors in the pipeline.

The executive sequencing of the external communication requests by the bus controllers thus ensues parallel in time with the processing of data in the pipeline. In the framework of external memory cycles, the data to be processed is either read from the external components by the processors or is written into the external memories as results.

The following data flow paths are therefore possible within the circuit:

i) data is supplied via the first external bus EXBUS1 to the first bus controller BC1, is forwarded from this point via the internal bus INTBUS to the second bus controller BC2 and is output by the latter onto the second external bus EXBUS2; and ii) data is supplied via the first external bus EXBUS1 to the first bus controller BC1, is forwarded from this point to the first processor PU1, to the buffer memory $ZSP1_a$ and to the second processor PU2 for processing and, subsequently, is output via the second bus controller BC2 onto the second external bus EXBUS2.

Both of the indicated data flow paths i) and ii) also function in the opposite direction, whereby, however, the data given the path via the processor pipeline is conducted over the buffer memory $ZSP1_b$ because this is open for the opposite data flow direction.

Figure 2:
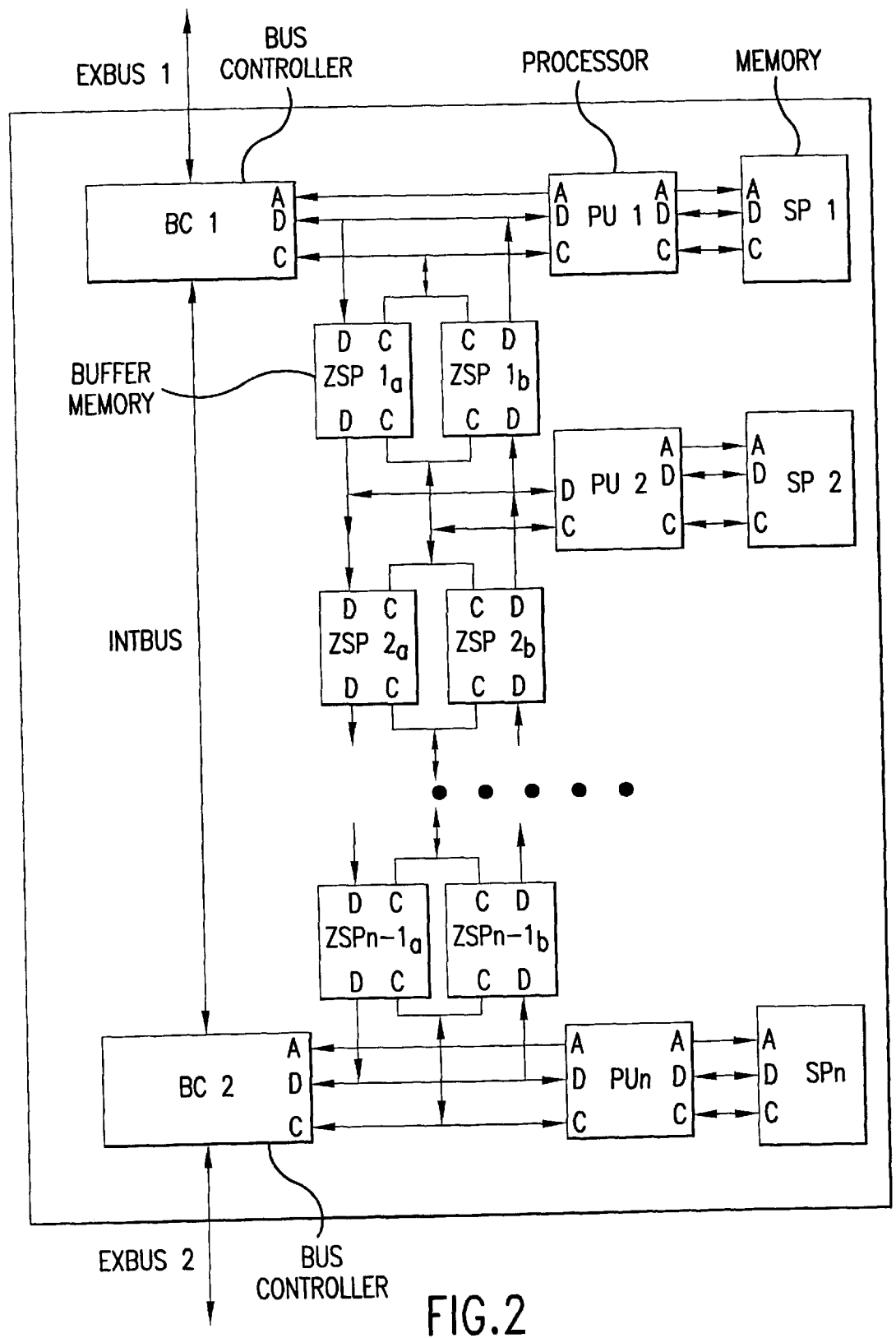
FIG. 2 is a block diagram of the inventive circuit with a plurality of integrated processors.

FIG. 2 shows a second exemplary embodiment of the present invention that differs from the above-described exemplary embodiment in that the pipeline comprises a plurality of processors PU1 through PUN. Analogous to the first exemplary embodiment, a respective program and data memory SP1 through SPN is also allocated to each processor. Two processors, that are connected following one another in the pipeline, are coupled to one another by intervening buffer memories $ZSP1_a$, $ZSP1_b$ ... $ZSPn-1_a$, $ZSPn-1_b$.

The first processor PU1 in the pipeline is directly coupled to the first bus controller BC1 and the last processor in the pipeline PUN is directly coupled to the second bus controller BC2; the intervening processors PU2 through PUN-1, by contrast, do not have a direct connection to one of the two bus controllers BC1, BC2. The two bus controllers are in communication with one another via an internal bus INTBUS. The data processing and the data transfer ensue analogous to what was already described for the above-explained exemplary embodiment.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electronic circuit for converting data, the circuit comprising:

at least two processors;

a program and data memory allocated to each of said processors;

an external data bus;

two external bus connections;

two FIFO channels for data traffic between said processors; and two bus controllers that control data transfer between said processors and said external buses connections, whereby said processors, said program and data memory and said bus controllers are integrated on an application-specific integrated circuit.

2. The electronic circuit according to claim 1, wherein a plurality of mini-processors are arranged on the application-specific integrated circuit in a pipeline architecture.

3. The electronic circuit according to claim 2, wherein the mini-processors are connected to one another via buffer memories for mutual data exchange.

4. The electronic circuit according to claim 3, wherein the buffer memories are first-in, first out memories.

5. The electronic circuit according to claim 3, wherein the electronic circuit further comprises an internal bus via which the data can be directly transmitted is provided between two bus controllers thereby bypassing the buffer memories of the pipeline.

6. The electronic circuit according to claim 2, wherein each of two mini-processors of the plurality of mini-processors lying closest to the external data bus is directly connected to a respective bus controller without buffer memory.

7. The electronic circuit according to claim 1, wherein the bus controller has a data buffer.

8. An electronic circuit for converting data in communications technology, comprising:
- a plurality of mini-processors arranged in a pipeline architecture;
- a plurality of program and data memories that are respectively allocated to the plurality of mini-processors;
- a plurality of bus controllers that controls data transfer between the mini-processors's and the external data bus;
- the mini-processors, the program and data memories and the bus controllers being integrated on an application-specific integrated circuit.

9. The electronic circuit according to claim 8, wherein the mini-processors are connected to one another via buffer memories for mutual data exchange.

10. The electronic circuit according to claim 9, wherein the buffer memories are first-in, first out memories.

11. The electronic circuit according to claim 9, wherein the electronic circuit further comprises an internal bus via which the data can be directly transmitted is provided between two bus controllers thereby bypassing the buffer memories of the pipeline.

12. The electronic circuit according to claim 8, wherein each of two mini-processors of the plurality of mini-processors lying closest to the external data bus is directly connected to a respective bus controller without buffer memory.

13. The electronic circuit according to claim 8, wherein the bus controller has a data buffer.

14. An electronic circuit for converting data in communications technology, comprising:
- a plurality of mini-processors arranged in a pipeline architecture;
- a plurality of program and data memories that are respectively allocated to the plurality of mini-processors;
- a plurality of bus controllers that controls data transfer between the mini-processors's and the external data bus;
- the mini-processors, the program and data memories and the bus controllers being integrated on an application-specific integrated circuit; and
- the mini-processors being connected to one another via buffer memories for mutual data exchange.

15. The electronic circuit according to claim 13, wherein the buffer memories are first-in, first out memories.

16. The electronic circuit according to claim 13, wherein the electronic circuit further comprises an internal bus via which the data can be directly transmitted is provided between two bus controllers thereby bypassing the buffer memories of the pipeline.

17. The electronic circuit according to claim 13, wherein each of two mini-processors of the plurality of mini-processors lying closest to the external data bus is directly connected to a respective bus controller without buffer memory.

* * * * *